United States Patent [19]

Eimers et al.

[11] 4,102,859
[45] Jul. 25, 1978

[54] STABILIZER MIXTURES

[75] Inventors: Erich Eimers; Rolf Dheim; Wolfgang Cohnen, all of Krefeld, Fed. Rep. of Germany

[73] Assignee: Bayer Aktiengesellschaft, Leverkusen, Fed. Rep. of Germany

[21] Appl. No.: 707,748

[22] Filed: Jul. 22, 1976

Related U.S. Application Data

[63] Continuation-in-part of Ser. No. 659,385, Feb. 19, 1976, abandoned.

[30] Foreign Application Priority Data

Mar. 11, 1975 [DE] Fed. Rep. of Germany ....... 2510463
Mar. 18, 1975 [DE] Fed. Rep. of Germany ....... 2511730

[51] Int. Cl.² .......................... C08K 5/52; C08K 5/15
[52] U.S. Cl. ............................ 260/45.8 A; 106/176; 106/177; 252/400 R; 252/400 A; 252/407
[58] Field of Search ................... 260/45.8 A, 333; 252/182, 400 R, 400 A; 106/176, 177

[56] References Cited

U.S. PATENT DOCUMENTS

| 2,733,226 | 1/1956 | Hunter ............................ 260/45.8 A |
| 3,209,013 | 9/1965 | Hechenbleikner et al. ......... 260/333 |
| 3,446,819 | 5/1969 | Ardis ............................... 260/45.8 A |
| 3,463,789 | 8/1969 | Wojtonicz et al. ................. 260/333 |
| 3,509,091 | 4/1970 | Cleveland et al. .............. 260/45.8 R |
| 3,794,629 | 2/1974 | Einers et al. .................... 260/45.8 A |

OTHER PUBLICATIONS

DOS 2,140,207, 2/15/1973, Bayer A/G (The Counterpart of Einers et al.).

*Primary Examiner*—H.S. Cockeram
*Attorney, Agent, or Firm*—Gene Harsh; Lawrence S. Pope; Frederick H. Colen

[57] ABSTRACT

The present invention teaches mixtures of neutral esters of phosphorous acid with oxetane compounds and plastics stabilized by the incorporation of said mixtures. The present invention teaches a method of improving the retention of light transmission in plastics, particularly polycarbonate, by the incorporation therein of mixtures of neutral esters of phosphorous acid and oxetane compounds in which there are 2 to 10 oxetane groups per phosphorus atom.

33 Claims, No Drawings

STABILIZER MIXTURES

This application is a continuation-in-part of Ser. No. 659,385, filed Feb. 19, 1976, and now abandoned.

BACKGROUND OF THE INVENTION

It is known to improve the color and transparency to light of plastics, especially of aromatic polycarbonates, by adding neutral esters of phosphorous acid. Esters of phosphorous acid with alcohols containing oxetane groups have proved particularly suitable. In contrast to phosphites used previously, these phosphites prevent the severe brown discoloration of the plastic under the influence of atmospheric oxygen and heat. The phosphites containing oxetanes, the use of which is described in DT-OS (German Published Specification) No. 2,140,207, and U.S. Pat. No. 3,794,629 can be prepared in a known manner by transesterification of trialkyl phosphites or triaryl phosphites with oxetane compounds of the type

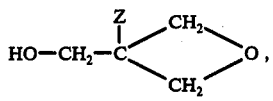

wherein
Z = H, alkyl, cycloalkyl or aryl, (compare U.S. Pat. No. 3,209,013).

The invention is based on the recognition of the fact that it is not necessary to employ phosphites containing oxetane groups and that instead the addition of even small amounts of a mixture of trialkyl phosphites or triaryl phosphites and oxetane compounds, preferably the alcohols containing oxetane groups which are also used to prepare oxetane-containing phosphites, to the plastic produces an equally good lightening of the color, and that the plastics stabilized in this way also prove to be highly stable in respect of color, and in some cases even more stable, in respect to color, to heat and atmospheric oxygen.

It is furthermore known to employ phosphites, mixed with epoxide compounds, as color lighteners and stabilizers in polycarbonates (DT-OS (German Published Specifications) Nos. 1,694,285 and 2,040,251). However, these mixtures are far inferior to the mixtures of phosphite with oxetane compound.

SUMMARY OF THE INVENTION

The subject of the invention are mixtures of neutral esters of phosphorous acid and oxetane compounds, preferably those of boiling point above 200° C.

The ratio in which the neutral esters of phosphorous acid and the oxetane compounds are mixed should be so chosen that there are 2-10, preferably 3-6, oxetane groups per P atom in the mixture.

The invention also includes plastics compositions comprising a neutral ester of phosphorous acid and an oxetane compound and containing from 2 to 10 oxetane groups per P-atom. In general, in order to achieve the desired color-lightening and color-stabilizing effect, these ingredients are added to the plastics material so that, together, they amount to between 0.01 and 1% by weight, preferably between 0.02 and 0.3% by weight, relative to the plastic to be stabilized.

Suitable oxetane compounds are, for example, those of the formula (2)

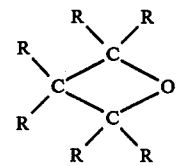

wherein
R is identical or different and can be H, $C_1$-$C_{18}$-alkyl, $C_3$-$C_{12}$-cycloalkyl, $C_6$-$C_{15}$-aryl, $C_7$-$C_{15}$-aralkyl or a radical $CH_2O$-R',
wherein
R' is H, $C_1$-$C_{18}$-alkyl, $C_3$-$C_{12}$-cycloalkyl, $C_6$-$C_{15}$-aryl, $C_7$-$C_{15}$-aralkyl or an acyl radical of a monobasic or polybasic carboxylic acid or of an inorganic acid.

Examples of oxetane compounds of the formula (2) are those, of which the preparation is described in the summarizing review by E. J. Goethals, Ind. Chim. Belge., T 30 No. 6, page 556 et seq., such as 2,2-diphenyl-3,4-dimethyloxetane and 2,2-diphenyl-3,3-dimethyloxetane.

Further suitable oxetane compounds are described in DOS (German Published Specification) 1,907,117, such as 3-ethyl-oxetanyl-(3)-carboxylic acid ethyl ester, 3-ethyl-oxetanyl-(3)-carboxylic acid [3-ethyl-oxetanyl-(3)]-methyl ester and 3-amyl-oxetanyl-(3)-carboxylic acid [3-amyloxetanyl-(3)]-methyl ester.

Particularly suitable oxetane compounds are those of the formula (3)

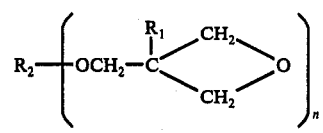

wherein
$R_1$ is H, $C_1$-$C_{18}$-alkyl, $C_1$-$C_{18}$-hydroxyalkyl, $C_6$-$C_{15}$-aryl, ($C_6$-$C_{15}$-aryl)-oxymethyl, $C_7$-$C_{15}$-aralkyl or ($C_7$-$C_{15}$-aralkyl)-oxymethyl,
$R_2$ is H, $C_1$-$C_{18}$-alkyl, $C_6$-$C_{15}$-aryl, $C_7$-$C_{15}$-aralkyl or the acyl radical of a monobasic or polybasic carboxylic acid or inorganic acid and
n is an integer which has a value of 1 or is equal to the acid functionality of the acid from which the acid radical $R_2$ is derived.

Compounds with $R_2$ = H or an acyl radical are particularly preferred. Examples which may be mentioned are 3-hydroxymethyl-3-methyloxetane, 3-hydroxymethyl-3-ethyloxetane, 3-hydroxymethyl-3-amyloxetane, 3-hydroxymethyl-3-phenoxymethyloxetane, 3-hydroxymethyl-3-p-tert.-butyl-phenoxymethyloxetane, 3,3-bis-hydroxymethyloxetane, 3-hydroxymethyl-3-octyloxetane, 3-hydroxymethyl-3-benzyloxetane, 3-phenoxymethyl-3-ethyloxetane, 3-octadecyloxymethyl-3-ethyloxetane, 3-phenoxymethyl-3-amyloxetane, [3-ethyloxetanyl-(3)]-methyl benzoate, [3-methyl-oxetanyl-(3)]-methyl cinnamate, [3-ethyloxetanyl-(3)]-methyl stearate, [3-amyl-oxetanyl-(3)]-methyl acrylate and esters of polybasic carboxylic acids or inorganic acids.

The following can function as such acids: carbonic acid, oxalic acid, malonic acid, succinic acid, adipic acid, citraconic acid, citric acid, tartaric acid, diglycollic acid, thiodiglycollic acid, cyclohexane-1,2-dicarboxylic acid, cyclohex-4-ene-1,2-dicarboxylic acid, o-, iso- and terephthalic acid, endomethylenetetrahydrophthalic acid, biphenylene-4,4'-dicarboxylic acid, trimellitic acid and pyromellitic acid.

Furthermore, corresponding esters of non-carboxylic acids can also be used, such as, for example, the esters of boric acid, silicic acid, alkylboric acid, arylboric acid, stannonic acids and stibonic acids and also esters of o-, pyro- and poly-phosphoric acid, of alkanephosphonic acids and arylphosphonic acids, of dialkylphosphinic acids and of diarylphosphinic acids.

In addition to the esters of the above-mentioned acids which exclusively contain the radicals of oxetane-containing alcohols, it is also possible to use those mixed esters of these acids which in addition to at least one radical of an oxetane-containing alcohol also contain one or more radicals of other monohydric or polyhydric alcohols or phenols as ester groups. Radicals of the following alcohols can be contained in these ester groups: methanol, ethanol, isopropyl alcohol, n-propyl alcohol, n-, sec.- and tert.-butyl alcohol, isobutyl alcohol, 2-ethylhexanol, octyl alcohol and isooctyl alcohol, decyl alcohol, lauryl alcohol, octadecyl alcohol, allyl alcohol, methallyl alcohol, geraniol, propargyl alcohol, cyclohexyl alcohol, cyclohexylcarbinol, benzyl alcohol, β-phenylethyl alcohol, cinnamyl alcohol, phenol, α- and β-naphthol, 2,6-di-tert.-butyl-p-cresol, o- cyclohexylphenol, p-propylphenol, o- and p-propenylphenol and also alcohols and phenols containing ether groups such as, for example, ethylene glycol monomethyl ether, ethylene glycol monobutyl ether, phenoxyethanol, hydroquinone mono methyl ether and hydroquinone monobutyl ether, and also polyhydric alcohols and phenols, such as ethylene glycol, 1,2-propylene glycol, 1,2-butanediol, 1,4-butanediol, 1,3-butanediol, 1,4-bis-hydroxymethylcyclohexane, 1,9-dihydroxyoctadecane, 1,6-hexanediol, 2,2-dimethyl-1,3-propanediol, glycerol, 1,1,1-tris-hydroxymethylpropane, 1,1,1-trishydroxymethylhexane, 1,1,1-tris-hydroxymethylethane, pentaerythritol, pentaerythritol monoalkyl ethers and pentaerythritol dialkyl ethers, sorbitol, methylglucose, hydroquinone, resorcinol, pyrocatechol, pyrogallol, phlorogucitol and 2,2-bis-(hydroxyphenyl)-propane.

According to the invention, it is possible to employ either individual members of the above-mentioned oxetane compounds or mixtures of the above-mentioned oxetane compounds, together with individual phosphites or mixtures of different phosphites.

Possible neutral esters of phosphorous acid are (cyclo)aliphatic, mixed (cyclo)aliphatic-aromatic or aromatic esters of phosphorous acid, containing 1 to 12 P atoms. Phosphites which have a boiling point above 200° C are preferred.

Examples of possible phosphites which may be mentioned are tridecyl phosphite, trioctadecyl phosphite, tribenzyl phosphite, tris-[(tetrahydrofuranyl-2)-methyl] phosphite, tris-[(5-ethyl-1,3-dioxanyl-5)-methyl] phosphite, tricyclohexyl phosphite, tris-2-ethylhexyl phosphite, didecylmonophenyl phosphite, triphenyl phosphite, trinaphthyl phosphite, tris-p-t-butyl-phenyl phosphite, tris-o-cyclohexylphenyl phosphite, tris-2,6-t-butyl-4-methyl-phenyl phosphite, 2-phenyloxy-5,5-dimethyl-1,3-dioxaphosphorinane, 2-phenoxy-5-ethyl-1,3-dioxaphosphorinane, 2-p-t-butylphenoxy-1,3-dioxa-5-methyl-5-propyl-phosphorinane, 2-[2,6-di-t-butyl-4-methylphenoxy]-1,3-dioxa-5,5-diethylphosphorinane, 2-[2,6-dimethylphenoxy]-1,3-dioxa-5-ethylphospholane and bicyclic phosphites, such as, for example, 1-methyl-4-phospha-3,5,8-trioxa-[2,2,2]-octane and 1-amyl-4-phospha-3,5,8-trioxa-[2,2,2]-octane, and also those esters of phosphorous acid which contain two or more P atoms in the molecule, that is to say compounds of the general formula (4)

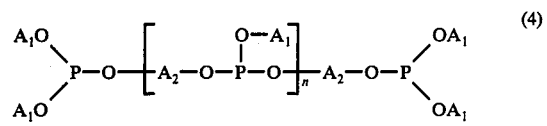

wherein
$A_1$ is $C_1$-$C_{18}$-alkyl or $C_6$-$C_{15}$-aryl,
$A_2$ is $C_2$-$C_{15}$-alkylene or $C_6$-$C_{19}$-arylene and
$n$ is an integer from 0 to 10, preferably from 0 to 2.

The phosphites of the formula (4) can be prepared in a known manner by trans-esterification of aliphatic or aromatic phosphites with dihydric alcohols or phenols.

Examples of monohydric alcohols or phenols $A_1$—OH which may be mentioned are methyl alcohol, ethyl alcohol, isopropyl alcohol, allyl alcohol, butyl alcohol, 5-hydroxymethyl-5-ethyl-1,3-dioxane, phenol p-cresol and p-tert.-butylphenol. Dihydric alcohols or phenols OH-$A_2$-OH which can be used are ethylene glycol, 1,4-butylene glycol, 1,2-propylene glycol, 2,2-dimethyl-1,3-propanediol, diethylene glycol, thiodiglycol, triethylene glycol, 1,4-dimethylolcyclohexane, 2,2-bis-(4-hydroxycyclohexyl)-propane, pyrocatechol, resorcinol, hydroquinone, 2,2-di-(p-hydroxyphenyl)-propane, bis-(3,5-dimethyl-4-hydroxyphenyl)-propane, bis-(3,5-dibromo-4-hydroxyphenyl)-propane and the like.

In place of the dihydric alcohols or phenols HO—$A_2$—OH which give the phosphites of the formula (4), it is also possible to employ alcohols or phenols with more than two hydroxyl groups, such as, for example, glycerol, pentaerythritol, sorbitol, β-methylglucose, pyrogallol, phloroglucinol and the like. These then result, in general terms, in phosphites (4a), which contain further radicals

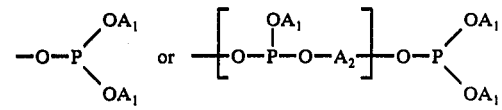

bonded to $A_2$.

Possible plastics which can be stabilized with the above mentioned mixtures are rubbers, such as butadiene polymers and isoprene polymers, nigh pressure and low pressure polyethylene, polypropylene, polyacrylonitrile, acrylonitrile-butadiene-styrene copolymers, alkylene polyesters of terephthalic acid, such as, for example, polyethylene terephthalate, 1,4-polybutylene terephthalate and poly-1,4-cyclohexane-dimethylene terephthalate, polyvinyl chloride, polytetrafluoroethylene, polyphenylene oxide, polyamide and Cellite, but especially polycarbonates obtained from the bis-(hydroxyphenyl)-propanes mentioned later. The plastics mentioned can, in addition to the stabilizer mixture claimed according to the invention, also contain UV-stabilizers, plasticizers, fillers, flameproofing agents and organic and inorganic pigments. Instead of the individual plastics it is also possible to convert mixtures of the plastics mentioned with one another into products of stable color by adding the stabilizer mixtures.

The stabilized polycarbonates can be prepared by metering the phosphite and oxetane separately or as a mixture into the polycarbonate. The compounds may be added in the pure form to the molten polycarbonate or, if appropriate, as a solution in a low-boiling solvent into the polycarbonate solution. The polycarbonates, stabilized against discoloration, which are claimed, can also be prepared by impregnating the powdered or granulated polycarbonate with the mixture of phosphite and oxetane (where appropriate with a solution of the phosphite and oxetane in a solvent) in a suitable mixing apparatus, by so-called, "coating by tumbling." The stabilized polycarbonate is then processed in accordance with known techniques.

Analogous remarks apply to the metering of the mixture of the oxetane and phosphite into the melt or into a solvent during the preparation of the polycarbonate according to known processes.

Polycarbonates which can be used are the polycondensates obtainable by reaction of dihydroxydiarylalkanes with phosgene or diesters of carbonic acid, and in addition to the unsubstituted dihydroxydiarylalkanes, other suitable dihydroxydiarylalkanes are those in which the aryl radicals carry methyl groups or halogen atoms in the o- and/or m-position relative to the hydroxyl group. Branched polycarbonates are also suitable.

The polycarbonates to be stabilized have mean molecular weights $\overline{M}w$ between about 10,000 and 100,000, preferably between about 20,000 and 40,000, determined by measuring the relative viscosity in $CH_2Cl_2$ at 25° C and a concentration of 0.5% by weight. Examples of suitable aromatic dihydroxy compounds are hydroquinone, resorcinol, 4,4'-dihydroxydiphenyl, bis-(hydroxyphenyl)-alkanes, such as, for example, $C_1$-$C_8$-alkylene-bisphenols and $C_2$-$C_8$-alkylidene-bisphenols, bis-(hydroxyphenyl)-cycloalkanes, such as, for example, $C_5$-$C_{15}$-cycloalkylene-bisphenols and $C_5$-$C_{15}$-cycloalkylidene-bisphenols, bis-(hydroxyphenyl)-sulphides, -ethers, -ketones, -sulphoxides or -sulphones, and also α,α'-bis-(hydroxyphenyl)-diisopropylbenzene as well as the corresponding nuclear-alkylated or nuclear-halogenated compounds. Polycarbonates based on bis-(4-hydroxyphenyl)-propane-2,2 (bisphenol A), bis-(4-hydroxy-3,5-dichlorophenyl)-propane-2,2 (tetrachlorobisphenol A), bis-(4-hydroxy-3,5-dibromophenyl)-propane-2,2 (tetrabromobisphenol A), bis-(4-hydroxy-3,5-dimethylphenyl)-propane-2,2 (tetramethylbisphenol A) and bis-(4-hydroxyphenyl)-cyclohexane-1,1 (bisphenol Z), or based on trinuclear bisphenols such as α,α'-bis-(4-hydroxyphenyl)p-diisopropylbenzene are perferred.

Further bisphenols suitable for the preparation of polycarbonate are described in U.S. Pat. Nos. 3,028,365; 2,999,835; 3,148,172; 3,271,368; 2,970,131; 2,991,273; 3,271,367; 3,280,078; 3,014,891 and 2,999,846.

The polycarbonates stabilized according to the invention can furthermore contain the known additives such as, for example, fillers, dyestuffs, pigments and/or other stabilizers.

The polycarbonates stabilized according to the invention are used particularly, where the shaped articles produced are exposed to prolonged high heat conditions and where furthermore it is required that all the articles should have a high light transmission. This applies preferentially to the use in the lighting field, for example, for lamp coverings or glazing using polycarbonate sheets.

The invention is illustrated in the following examples in which the parts mentioned are parts by weight.

PREPARATION OF THE POLYCARBONATE 454 parts of 2,2-bis-(p-hydroxyphenyl)-propane and 9.5 parts of p-tert.-butylphenol are suspended in 1.5 l of water in a 3-necked flask, equipped with a stirrer and gas inlet tube, and the oxygen is then removed from the reaction mixture by passing nitrogen through the latter for 15 minutes while stirring. 355 parts of 45% strength sodium hydroxide solution and 1,000 parts of methylene chloride are then added. The mixture is cooled to 25° C. 237 parts of phosgene are added over a period of 120 minutes while maintaining this temperature. An additional amount of 75 parts of a 45% strength sodium hydroxide solution is added after 15 to 30 minutes, or after the absorption of phosgene has started. 1.6 parts of triethylamine are added to the resulting solution and the mixture is stirred for a further 15 minutes. A highly viscous solution is obtained, of which the viscosity is regulated by adding methylene chloride. The aqueous phase is separated off. The organic phase is washed with water until free from salt and alkali. The polycarbonate is isolated from the washed solution, and dried. It has a relative viscosity of 1.29 to 1.30, measured in an 0.5% strength solution in methylene chloride at 20° C. This corresponds approximately to a molecular weight of 32,000. The polycarbonate thus obtained is extruded and granulated.

Preparation of the Stabilized Polycarbonate Compositions

The granulated polycarbonate prepared according to the above description is mixed with the amounts of various phosphite stabilizer mixtures listed in the table which follows, by so-called tumbler-coating. Thereafter, the granules are extruded at 300° C, using a mixing extruder, to give a ribbon. This ribbon is again chopped into granules, which are converted to standard test bars in an injection molding machine at 330° C.

The following phosphites or phosphite-oxetane mixtures were employed:

EXAMPLES IA to IC

Comparative experiments with
(A) tris-(tetrahydrofuranyl-2)-methyl phosphite,
(B) a mixture of a phosphite and an epoxide compound: 310 parts by weight of triphenyl phosphite (1 mol) (1 P-equivalent) + 426 parts by weight of cyclohexane-1,2-dicarboxylic acid bis-β-epoxypropyl ester (1.5 mols) (=3 epoxide equivalents) or
(C) tris-[(3-ethyloxyetanyl-3)-methyl]phosphite.

EXAMPLES IIA to IIE

Stabilizer mixtures according to the invention:
(A) mixture of 310 parts by weight of triphenyl phosphite (1 mol) + 306 parts by weight of 3-hydroxymethyl-3-methyloxetane (3 mols) (= 3 oxetane equivalents);
(B) mixture of 310 parts by weight of triphenyl phosphite (1 mol) + 790 parts by weight of 3-hydroxymethyl-3-amyl-oxetane (5 mols) (= 5 oxetane equivalents);
(C) mixture of 226 parts by weight of 2-phenoxy-5-ethyl-1,3-dioxaphosphorinane (1 mol) + 306 parts of 3-methyl-3-hydroxymethyloxetane (3 mols) (= 3 oxetane equivalents);
(D) mixture of 334 parts by weight of tris-[(tetrahydrofuranyl-2)-methyl] phosphite (1 mol) + 474 parts by weight of 3-hydroxymethyl-3-amyloxetane (3 mols) (= 3 oxetane equivalents); or (E) mixture of 334 parts by weight of tris-[(tetrahydrofuranyl-2)-methyl] phosphite (1 mol) + 774 parts by weight of bis-[(3-ethyloxetanyl-3)-methyl carbonate] (3 mols) (= 6 oxetane equivalents).

The results obtained with the above-mentioned phosphites and stabilizer mixtures are recorded in the table which follows.

| Polycarbonate stabilized with stabilizer | | Concentration [% by weight] | Light transmission*) at 420 nm | Light transmission after 63 days at 140° C | Appearance after 63 days |
|---|---|---|---|---|---|
| I | A | 0.1 | 0.790 | severe molecular weight degradation after short storage time | |
| | B | 0.1 | 0.840 | 0.490 | brownish |
| | C | 0.1 | 0.850 | 0.700 | pale yellowish |
| II | A | 0.1 | 0.845 | 0.760 | pale yellowish |
| | B | 0.1 | 0.850 | 0.770 | almost colorless |
| | C | 0.1 | 0.845 | 0.730 | pale yellowish |
| | D | 0.1 | 0.840 | 0.620 | yellowish |
| | E | 0.1 | 0.840 | 0.680 | yellowish |

*)measured according to DIN 5,033 and 4,646

The stabilized alkylene polyesters of terephthalic acid can be prepared according different methods; the following three methods are for example mentioned:

(a) Adding of the components of the stabilizer mixture, separately or as mixture, in the pure form or as a solution in an appropriate solvent to the molten alkylene polyester of terephthalic acid for example during melting of the alkylene polyester of terephthalic acid in an extruder;

(b) applying of the components of the stabiliser mixture, separately or as mixture, in the pure form or as solution in an appropriate solvent, onto the polyalkylene glycol terephthalate, and subsequently melting and preparing the shaped article desired;

(c) adding of the components of the stabilizer mixture, separately or as mixture, in the pure form or as a solution in an appropriate solvent, during the preparation of the polyalkylene glycol terephthalate.

Polyalkylene glycol terephthalates which can be stabilized according to the instant invention are, for example, those based on ethylene glycol, 1.3-propane diol, 1.4-butanediol, 1.6-hexanediol and 1.4-bis-hydroxymethylcyclohexane, thus, for example, polyethylene terephthalate, 1.4-polybutylene terephthalate and poly-1.4-cyclohexane-dimethylene terephthalate. The molecular weights ($\overline{M}w$) of these alkylene polyesters of terephthalic acid are between about 20,000 and 200,000, or can be characterized by intrinsic viscosity values between 0.55 and 2.0 dl/g, preferably between 0.6 and 1.5 dl/g and most preferably between 0.7 and 1.3 dl/g, measured in a solvent mixture of equal parts of phenol and tetrachloroethane at 25° C. The alkylene polyesters of terephthalic acid can be prepared according methods which are well known in the art. (see "Kunststoff-Handbuch, Vol. VIII, page 695 ff, Carl-Hanser-Verlag, Munich 1973" and the references cited therein). They are for example obtained by transesterification from terephthalic acid dialkyl esters and the appropriate diol (see, for example U.S. Pat. No. 3,940,367 respectively DT-OS No. 2,340,559, and British Pat. No. 1,305,130 respectively DT-OS No. 2,059,539).

The polyalkylene glycol terephthalates stabilized according to the instant invention can furthermore contain the known additives such as, for example, reinforcing fillers (see e.g. DT-AS No. 2,042,447), flame-retarding additives (see e.g. DT-AS No. 2,042,450), mold release agents (see e.g. DT-OS No. 1,921,010), nucleating agents (see e.g. DT-OS No. 2,111,605 and DT-OS No. 2,139,125), pigments and other fillers.

The alkylene polyesters of terephthalic acid stabilized according to the instant invention are used particularly where the shaped articles produced are exposed to prolonged heat conditions and where furthermore it is required that all the articles should have a high stability against UV-irradiation This applies preferentially to the use in the lighting field, for example for lamp coverings.

The invention is further illustrated in the following Example in which the parts mentioned are parts by weight.

Preparation of a Stabilized Polyalkylene Glycol Terephthalate Composition

Starting components:

(a) 1.4-Polybutylene terephthalate having an intrinsic viscosity of 0.887 dl/g (measured in equal parts of phenol and tetrachloroethane at 25° C), (b) mixture of 1 mol triphenyl phosphite and 3 mols of 3-hydroxymethyl-3-amyl-oxetane.

In a single screw extruder having three zones and having a diameter of 6 cm, a length of 162 cm, a feeding zone of 42 cm, a compressing zone of 30 cm and a metering zone of 90 cm, 99.9 part of the 1.4-polybutylene terephthalate and 0.1 part of the mixture of the stabilizers are melted and intimately mixed to obtain a homogeneous blend. The extruded rope is cooled in water and thereafter chapped into granules. The granules are converted to standard test bar in a injection molding machine at 260° C, and thereafter the test bars are treated with hot air of 180° and 160° C. The results of the treatment are given below and show that the treatment with 180° C air for 6 days and the treatment with 160° C air for 24 days will not affect the stabilized polybutylene-terephthalate whereas polybutylene-terephthalate being not stabilized according the instant invention, will be remarkably decomposed by the 180° C treatment for 6 days and by the 160° C treatment for 24 days. The intrinsic viscsoity of 1.4-polybutylene-terephthalate measured in equal parts of phenol and tetra chloroethane at 25° C obtained from the treated test bars which are

| | 1. stabilized and | 2. not stabilized |
|---|---|---|
| treatment with 180° C air for the following number of days: | | |
| 0 day: | 0.887 dl/g | 0.877 dl/g |
| 1 day: | 0.865 dl/g | 0.567 dl/g |
| 6 days: | 0.785 dl/g | 0.512 dl/g |
| treatment with 160° C air for the following number of days: | | |
| 0 day: | 0.887 dl/g | 0.877 dl/g |
| 6 days: | 0.860 dl/g | 0.70 dl/g |
| 15 days: | 0.862 dl/g | 0.55 dl/g |
| 24 days: | 0.860 dl/g | 0.50 dl/g |
| 41 days: | 0.72 dl/g | 0.48 dl/g |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A mixture comprising an oxetanyl free neutral ester of phosphorous acid and an oxetane compound and containing from 2 to 10 oxetane groups per phosphorus atom and wherein the oxetane compound is a compound of the formula

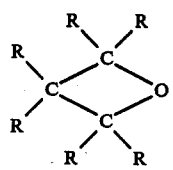

wherein each of the six groups R independently represents a hydrogen atom or a $(C_1-C_{18})$-alkyl, $(C_3-C_{12})$-cycloalkyl, $(C_6-C_{15})$-aryl, $(C_7-C_{15})$-aralkyl group or a group of the formula $CH_2O-R^1$ in which $R^1$ represents a $(C_1-C_{18})$-alkyl, $(C_6-C_{12})$-cycloalkyl, $(C_6-C_{15})$-aryl, $(C_7-C_{15})$aralkyl, an acyl radical of a mono- or polybasic carboxylic acid, or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic acids and of diarylphosphinic acids.

2. A mixture according to claim 1 containing from 3 to 6 oxetane groups per phosphorus atom.

3. A mixture according to claim 1 wherein the oxetane compound has a boiling point greater than 200° C.

4. A mixture according to claim 1 wherein the said ester is selected from the group consisting of an aliphatic, a cycloaliphatic, a mixed aliphatic/cycloaliphatic, a mixed aliphatic/aromatic, a mixed cycloaliphatic/aromatic and an aromatic ester of phosphorous acid, and which contains from 1 to 12 phosphorus atoms per molecule.

5. A mixture according to claim 1 wherein the said ester has a boiling point greater than 200° C.

6. A mixture according to claim 1 wherein the said ester is a compound of the formula

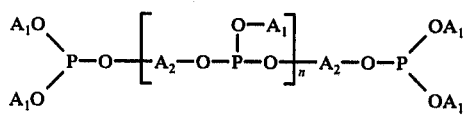

in which
$A_1$ is a $(C_1-C_{18})$-alkyl or a $(C_6-C_{15})$-aryl,
$A_2$ is a $(C_2-C_{15})$-alkylene or a $(C_6-C_{19})$-arylene and
$n$ is an integer of from 0 to 10.

7. A mixture according to claim 6 wherein at least one $A_2$ in the main chain is a $(C_2-C_{15})$-alkylene group or a $(C_6-C_{19})$-arylene group is substituted by a group of the formula

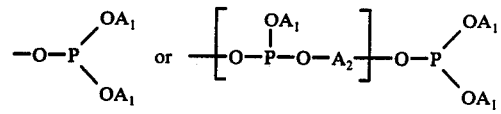

wherein $A_1$ and $A_2$ are as defined in claim 6.

8. A stabilizer mixture comprising an oxetanyl free neutral ester of phosphorous acid and an oxetane compound of the general formula (3)

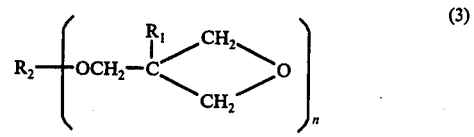

wherein
$R_1$ is H, $C_1-C_{18}$-alkyl, $C_6-C_{15}$-aryl, $(C_6-C_{15}$-aryl)-oxymethyl, $C_7-C_{15}$-aralkyl or $(C_7-C_{15}$-aralkyl)-oxymethyl,
$R_2$ is $C_1-C_{18}$-alkyl, $C_6-C_{15}$-aryl, $C_7-C_{15}$-aralkyl or the acyl radical of a monobasic or polybasic carboxylic acid or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic and diarylphosphinic acids, and
$n$ is an integer which has a value of 1 or is equal to the acid functionality of the acid from which the acid radical $R_2$ is derived, said mixture containing from 2 to 10 oxetane groups per phosphorus atom.

9. A mixture according to claim 8 wherein $R_2$ is the acyl radical of a mono- or polybasic carboxylic acid, or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic and diarylphosphinic acid.

10. A plastics composition stabilized against discoloration from heat and atmospheric oxygen comprising a plastics material, and an effective amount of a mixture of an oxetanyl free neutral ester of phosphorous acid and a phosphorus free oxetane compound, the mixture containing from 2 to 10 oxetane groups per phosphorus atom.

11. A composition according to claim 10 wherein the oxetane compound is a compound of the formula

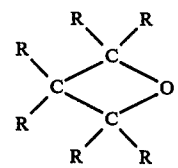

wherein each of the six groups R independently represents a hydrogen atom or a $(C_1-C_{18})$-alkyl, $(C_3-C_{12})$-cycloalkyl, $(C_6-C_{15})$aryl, $(C_7-C_{15})$-aralkyl group or a group of the formula $CH_2O-R^1$ in which $R^1$ represents a hydrogen atom, or a $(C_1-C_{18})$-alkyl, $(C_3-C_{12})$-cycloalkyl, $(C_6-C_{15})$-aryl, $(C_7-C_{15})$-aralkyl, or acyl radical of a mono- or polybasic carboxylic acid.

12. A composition according to claim 10 wherein the oxetane compound is a compound of the formula (3)

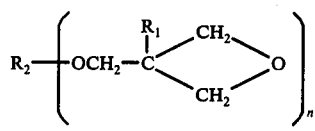 (3)

wherein
- $R_1$ is H, $C_1$-$C_{18}$-alkyl, $C_1$-$C_{18}$-hydroxyalkyl, $C_6$-$C_{15}$-aryl, ($C_6$-$C_{15}$-aryl)-oxymethyl, $C_7$-$C_{15}$-aralkyl or ($C_7$-$C_{15}$-aralkyl)-oxymethyl,
- $R_2$ is H, $C_1$-$C_{18}$-alkyl, $C_6$-$C_{15}$-aryl, $C_7$-$C_{15}$-aralkyl or the acyl radical of a monobasic or polybasic carboxylic acid and
- $n$ is an integer which has a value of 1 or is equal to the acid functionality of the acid from which the acid radical $R_2$ is derived.

13. A composition according to claim 10 wherein the said ester is an aliphatic or an cycloaliphatic or a mixed aliphatic/cycloaliphatic or a mixed aliphatic/aromatic or a mixed cycloaliphatic/aromatic or an aromatic ester of phosphorous acid, which may be cyclic and which contains from 1 to 12 phosphorus atoms per molecule.

14. A composition according to claim 10 wherein the said ester is a compound of the formula

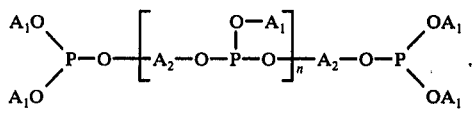

in which
- $A_1$ is a ($C_1$-$C_{18}$)-alkyl or a ($C_6$-$C_{15}$)-aryl,
- $A_2$ is a ($C_2$-$C_{15}$)-alkylene or a ($C_6$-$C_{19}$)-arylene and
- $n$ is an integer of from 0 to 10.

15. A composition according to claim 10 containing from 0.01 to 1% by weight of the said ester and the oxetane compound relative to the weight of the plastics material.

16. A composition according to claim 10 wherein the plastics material is a polycarbonate.

17. A molded article comprising a plastics composition according to claim 10.

18. A composition according to claim 10 wherein the plastics material is an alkylene polyester of terephthalic acid.

19. A composition according to claim 18 wherein the alkylene polyester of terephthalic acid is 1,4-polybutylene terephthalate.

20. A method of improving the stability of a plastics composition with respect to the light-transmission characteristics which comprises adding to the plastics material an effective amount of a mixture comprising an oxetanyl free neutral ester of phosphorous acid and a phosphorus free oxetane compound, said mixture containing from 2 to 10 oxetane groups per phosphorus atom.

21. A stabilized resin comprising a polybutadiene, and a stabilizing amount of a mixture of an oxetanyl free neutral ester of phosphorous acid and an oxetane compound having a formula selected from a) 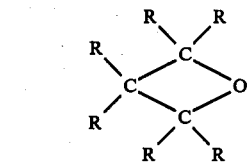 (2)

wherein each of the six groups R independently represents a hydrogen atom or a ($C_1$-$C_{18}$)-alkyl, ($C_3$-$C_{12}$)-cycloalkyl, ($C_6$-$C_{15}$)-aryl, ($C_7$-$C_{15}$)-aralkyl group or a group of the formula $CH_2O$-$R^1$ in which
   $R^1$ represents a hydrogen atom, or a ($C_1$-$C_{18}$)-alkyl, ($C_3$-$C_{12}$)-cycloalkyl, ($C_6$-$C_{15}$)-aryl, ($C_7$-$C_{15}$)-aralkyl, an acyl radical of a mono- or polybasic carboxylic acid, or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic acids and of diarylphosphinic acids, and b) 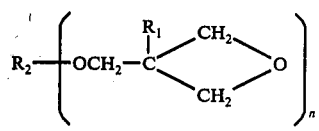 (3)

wherein
- $R_1$ is H, $C_1$-$C_{18}$-alkyl, $C_1$-$C_{18}$-hydroxyalkyl, $C_6$-$C_{15}$-aryl, ($C_6$-$C_{15}$-aryl)-oxymethyl, $C_7$-$C_{15}$-aralkyl or ($C_7$-$C_{15}$-aralkyl)-oxymethyl,
- $R_2$ is H, $C_1$-$C_{18}$-alkyl, $C_6$-$C_{15}$-aryl, $C_7$-$C_{15}$-aralkyl or the acyl radical of a monobasic or polybasic carboxylic acid
- or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic acids and of diarylphosphinic acids, and
- $n$ is an integer which has a value of 1 or is equal to the acid functionality of the acid from which the acid radical $R_2$ is derived, said mixture containing from 2 to 10 oxetane groups per phosphorus atom.

22. A stabilized resin comprising high or low pressure polyethylene, and a stabilizing amount of a mixture of an oxetanyl free neutral ester of phosphorous acid and an oxetane compound having a formula selected from a) 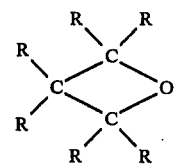 (2)

wherein each of the six groups R independently represents a hydrogen atom or a ($C_1$-$C_{18}$)-alkyl, ($C_3$-$C_{12}$)-cycloalkyl, ($C_6$-$C_{15}$)-aryl, ($C_7$-$C_{15}$)-aralkyl group or a group of the formula $CH_2O$-$R^1$ in which
   $R^1$ represents a hydrogen atom, or a ($C_1$-$C_{18}$)-alkyl, ($C_3$-$C_{12}$)-cycloalkyl, ($C_6$-$C_{15}$)-aryl, ($C_7$-$C_{15}$)-aralkyl, an acyl radical of a mono- or polybasic carboxylic acid, or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic acids and of diarylphosphinic acids, and b) 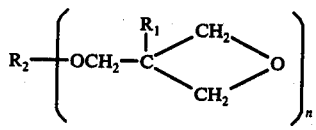 (3)

wherein $R_1$ is H, $C_1$-$C_{18}$-alkyl, $C_1$-$C_{18}$-hydroxyalkyl, $C_6$-$C_{15}$-aryl, ($C_6$-$C_{15}$-aryl)-oxymethyl, $C_7$-$C_{15}$-aralkyl or ($C_7$-$C_{15}$-aralkyl)-oxymethyl, $R_2$ is H, $C_1$-$C_{18}$-alkyl, $C_6$-$C_{15}$-aryl, $C_7$-$C_{15}$-aralkyl or the acyl radical of a monobasic or polybasic carboxylic acid or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic acids and of diarylphosphinic acids, and $n$ is an integer which has a value of 1 or is equal to the acid functionality of the acid from which the acid radical $R_2$ is derived, said mixture containing from 2 to 10 oxetane groups per phosphorus atom.

23. A stabilized resin comprising polypropylene, and a stabilizing amount of a mixture of an oxetanyl free neutral ester of phosphorous acid and an oxetane compound having a formula selected from a) 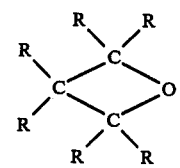 (2)

wherein each of the six groups R independently represents a hydrogen atom or a ($C_1$-$C_{18}$)-alkyl, ($C_3$-$C_{12}$)-cycloalkyl, ($C_6$-$C_{15}$)-aryl, ($C_7$-$C_{15}$)-aralkyl group or a group of the formula $CH_2O$-$R^1$ in which $R^1$ represents a hydrogen atom, or a ($C_1$-$C_{18}$)-alkyl, ($C_3$-$C_{12}$)-cycloalkyl, ($C_6$-$C_{15}$)-aryl, ($C_7$-$C_{15}$)-aralkyl, an acyl radical of a mono- or polybasic carboxylic acid, or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic acids and of diarylphosphinic acids, and b) (3)

$$R_2\text{---}\left(\text{OCH}_2\text{---}\underset{\underset{\text{CH}_2}{|}}{\overset{R_1}{\underset{|}{C}}}\overset{\text{CH}_2}{\diagdown}O\right)_n$$

wherein $R_1$ is H, $C_1$-$C_{18}$-alkyl, $C_1$-$C_{18}$-hydroxyalkyl, $C_6$-$C_{15}$-aryl, ($C_6$-$C_{15}$-aryl)-oxymethyl, $C_7$-$C_{15}$-aralkyl or ($C_7$-$C_{15}$-aralkyl)-oxymethyl, $R_2$ is H, $C_1$-$C_{18}$-alkyl, $C_6$-$C_{15}$-aryl, $C_7$-$C_{15}$-aralkyl or the acyl radical of a monobasic or polybasic carboxylic acid or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic acids and of diarylphosphinic acids, and $n$ is an integer which has a value of 1 or is equal to the acid functionality of the acid from which the acid radical $R_2$ is derived, said mixture containing from 2 to 10 oxetane groups per phosphorus atom.

24. A stabilized resin comprising polyacrylonitrile, and a stabilizing amount of a mixture of an oxetanyl free neutral ester of phosphorous acid and an oxetane compound having a formula selected from a) (2)

$$\underset{R}{\overset{R}{\diagdown}}C\underset{\diagdown}{\overset{\diagup}{\phantom{x}}}\underset{R}{\overset{R}{\diagup}}$$

wherein each of the six groups R independently represents a hydrogen atom or a ($C_1$-$C_{18}$)-alkyl, ($C_3$-$C_{12}$)-cycloalkyl, ($C_6$-$C_{15}$)-aryl, ($C_7$-$C_{15}$)-aralkyl group or a group of the formula $CH_2O$-$R^1$ in which $R^1$ represents a hydrogen atom, or a ($C_1$-$C_{18}$)-alkyl, ($C_3$-$C_{12}$)-cycloalkyl, ($C_6$-$C_{15}$)-aryl, ($C_7$-$C_{15}$)-aralkyl, an acyl radical of a mono- or polybasic carboxylic acid, or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic acids and of diarylphosphinic acids, and b) (3)

wherein $R_1$ is H, $C_1$-$C_{18}$-alkyl, $C_1$-$C_{18}$-hydroxyalkyl, $C_6$-$C_{15}$-aryl, ($C_6$-$C_{15}$-aryl)-oxymethyl, $C_7$-$C_{15}$-aralkyl or ($C_7$-$C_{15}$-aralkyl)-oxymethyl, $R_2$ is H, $C_1$-$C_{18}$-alkyl, $C_6$-$C_{15}$-aryl, $C_7$-$C_{15}$-aralkyl or the acyl radical of a monobasic or polybasic carboxylic acid or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic acids and of diarylphosphinic acids, and $n$ is an integer which has a value of 1 or is equal to the acid functionality of the acid from which the acid radical $R_2$ is derived, said mixture containing from 2 to 10 oxetane groups per phosphorus atom.

25. A stabilized resin comprising an acrylonitrile-butadiene-styrene copolymer, and a stabilizing amount of a mixture of an oxetanyl free neutral ester of phosphorous acid and an oxetane compound having a formula selected from a) 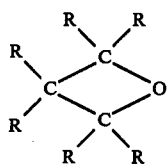 (2)

wherein each of the six groups R independently represents a hydrogen atom or a $(C_1-C_{18})$-alkyl, $(C_3-C_{12})$-cycloalkyl, $(C_6-C_{15})$-aryl, $(C_7-C_{15})$-aralkyl group or a group of the formula $CH_2O-R^1$ in which $R^1$ represents a hydrogen atom, or a $(C_1-C_{18})$-alkyl, $(C_3-C_{12})$-cycloalkyl, $(C_6-C_{15})$-aryl, $(C_7-C_{15})$-aralkyl, an acyl radical of a mono- or polybasic carboxylic acid, or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic acids and of diarylphosphinic acids, and b) 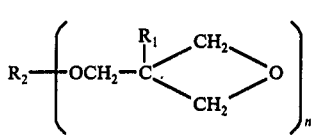 (3)

wherein $R_1$ is H, $C_1-C_{18}$-alkyl, $C_1-C_{18}$-hydroxyalkyl, $C_6-C_{15}$-aryl, $(C_6-C_{15}$-aryl)-oxymethyl, $C_7-C_{15}$-aralkyl or $(C_7-C_{15}$-aralkyl)-oxymethyl, $R_2$ is H, $C_1-C_{18}$-alkyl, $C_6-C_{15}$-aryl, $C_7-C_{15}$-aralkyl or the acyl radical of a monobasic or polybasic carboxylic acid or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic acids and of diarylphosphinic acids, and $n$ is an integer which has a value of 1 or is equal to the acid functionality of the acid from which the acid radical $R_2$ is derived, said mixture containing from 2 to 10 oxetane groups per phosphorus atom.

26. A stabilized resin comprising a polyvinyl chloride, and a stabilizing amount of a mixture of an oxetanyl free neutral ester of phosphorous acid and an oxetane compound having a formula selected from a) 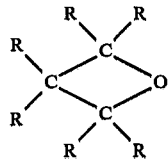 (2)

wherein each of the six groups R independently represents a hydrogen atom or a $(C_1-C_{18})$-alkyl, $(C_3-C_{12})$-cycloalkyl, $(C_6-C_{15})$-aryl, $(C_7-C_{15})$-aralkyl group or a group of the formula $CH_2O-R^1$ in which $R^1$ represents a hydrogen atom, or a $(C_1-C_{18})$-alkyl, $(C_3-C_{12})$-cycloalkyl, $(C_6-C_{15})$-aryl, $(C_7-C_{15})$-aralkyl, an acyl radical of a mono- or polybasic carboxylic acid, or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic acids and of diarylphosphinic acids, and b) 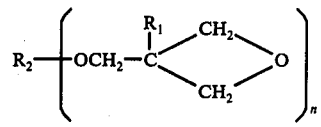 (3)

wherein $R_1$ is H, $C_1-C_{18}$-alkyl, $C_1-C_{18}$-hydroxyalkyl, $C_6-C_{15}$-aryl, $(C_6-C_{15}$-aryl)-oxymethyl, $C_7-C_{15}$-aralkyl or $(C_7-C_{15}$-aralkyl)-oxymethyl, $R_2$ is H, $C_1-C_{18}$-alkyl, $C_6-C_{15}$-aryl, $C_7-C_{15}$-aralkyl or the acyl radical of a monobasic or polybasic carboxylic acid or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic acids and of diarylphosphinic acids, and $n$ is an integer which has a value of 1 or is equal to the acid functionality of the acid from which the acid radical $R_2$ is derived, said mixture containing from 2 to 10 oxetane groups per phosphorus atom.

27. A stabilized resin comprising an addition polymer, and a stabilizing amount of a mixture of an oxetanyl free neutral ester of phosphorous acid and an oxetane compound having a formula selected from a) 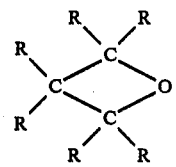 (2)

wherein each of the six groups R independently represents a hydrogen atom or a $(C_1-C_{18})$-alkyl, $(C_3-C_{12})$-cycloalkyl, $(C_6-C_{15})$-aryl, $(C_7-C_{15})$-aralkyl group or a group of the formula $CH_2O-R^1$ in which $R^1$ represents a hydrogen atom, or a $(C_1-C_{18})$-alkyl, $(C_3-C_{12})$-cycloalkyl, $(C_6-C_{15})$-aryl, $(C_7-C_{15})$-aralkyl, an acyl radical of a mono- or polybasic carboxylic acid, or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic acids and of diarylphosphinic acids, and b) 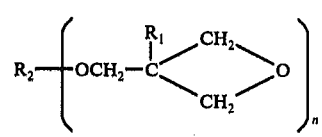 (3)

wherein $R_1$ is H, $C_1-C_{18}$-alkyl, $C_1-C_{18}$-hydroxyalkyl, $C_6-C_{15}$-aryl, $(C_6-C_{15}$-aryl)-oxymethyl, $C_7-C_{15}$-aralkyl or $(C_7-C_{15}$-aralkyl)-oxymethyl, $R_2$ is H, $C_1-C_{18}$-alkyl, $C_6-C_{15}$-aryl, $C_7-C_{15}$-aralkyl or the acyl radical of a monobasic or polybasic carboxylic acid or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic acids and of diarylphosphinic acids, and n is an integer which has a value of 1 or is equal to the acid functionality of the acid from which the acid radical $R_2$ is derived, said mixture containing from 2 to 10 oxetane groups per phosphorus atom.

28. A stabilized resin comprising a polyphenylene oxide, and a stabilizing amount of a mixture of an oxetanyl free neutral ester of phosphorous acid and an oxetane compound having a formula selected from a) 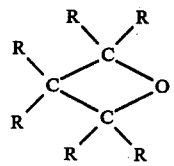 (2)

wherein each of the six groups R independently represents a hydrogen atom or a $(C_1-C_{18})$-alkyl, $(C_3-C_{12})$-cycloalkyl, $(C_6-C_{15})$-aryl, $(C_7-C_{15})$-aralkyl group or a group of the formula $CH_2O-R^1$ in which $R^1$ represents a hydrogen atom, or a $(C_1-C_{18})$-alkyl, $(C_3-C_{12})$-cycloalkyl, $(C_6-C_{15})$-aryl, $(C_7-C_{15})$-aralkyl, an acyl radical of a mono- or polybasic carboxylic acid, or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic acids and of diarylphosphinic acids, and b) 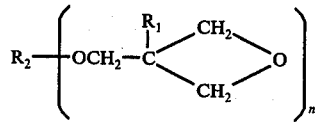 (3)

wherein $R_1$ is H, $C_1-C_{18}$-alkyl, $C_1-C_{18}$-hydroxyalkyl, $C_6-C_{15}$-aryl, $(C_6-C_{15}$-aryl)-oxymethyl, $C_7-C_{15}$-aralkyl or $(C_7-C_{15}$-aralkyl)-oxymethyl, $R_2$ is H, $C_1-C_{18}$-alkyl, $C_6-C_{15}$-aryl, $C_7-C_{15}$-aralkyl or the acyl radical of a monobasic or polybasic carboxylic acid or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic acids and of diarylphosphinic acids, and n is an integer which has a value of 1 or is equal to the acid functionality of the acid from which the acid radical $R_2$ is derived, said mixture containing from 2 to 10 oxetane groups per phosphorus atom.

29. A stabilized resin comprising a polyamide and a stabilizing amount of a mixture of an oxetanyl free neutral ester of phosphorous acid and an oxetane compound having a formula selected from a) 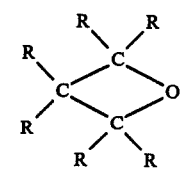 (2)

wherein each of the six groups R independently represents a hydrogen atom or a $(C_1-C_{18})$-alkyl, $(C_3-C_{12})$-cycloalkyl, $(C_6-C_{15})$-aryl, $(C_7-C_{15})$-aralkyl group or a group of the formula $CH_2O-R^1$ in which $R^1$ represents a hydrogen atom, or a $(C_1-C_{18})$-alkyl, $(C_3-C_{12})$-cycloalkyl, $(C_6-C_{15})$-aryl, $(C_7-C_{15})$-aralkyl, an acyl radical of a mono- or polybasic carboxylic acid, or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic acids and of diarylphosphinic acids, and b) 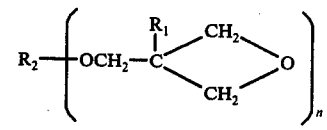 (3)

wherein $R_1$ is H, $C_1-C_{18}$-alkyl, $C_1-C_{18}$-hydroxyalkyl, $C_6-C_{15}$-aryl, $(C_6-C_{15}$-aryl)-oxymethyl, $C_7-C_{15}$-aralkyl or $(C_7-C_{15}$-aralkyl)-oxymethyl, $R_2$ is H, $C_1-C_{18}$-alkyl, $C_6-C_{15}$-aryl, $C_7-C_{15}$-aralkyl or the acyl radical of a monobasic or polybasic carboxylic acid or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic acids and of diarylphosphinic acids, and n is an integer which has a value of 1 or is equal to the acid functionality of the acid from which the acid radical $R_2$ is derived, said mixture containing from 2 to 10 oxetane groups per phosphorus atom.

30. A stabilized resin comprising a condensation polymer, and a stabilizing amount of a mixture of an oxetanyl free neutral ester of phosphorous acid and an oxetane compound having a formula selected from a) 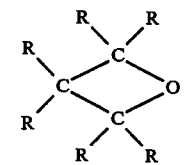 (2)

wherein each of the six groups R independently represents a hydrogen atom or a $(C_1-C_{18})$-alkyl, $(C_3-C_{12})$-cycloalkyl, $(C_6-C_{15})$-aryl, $(C_7-C_{15})$-aralkyl group or a group of the formula $CH_2O-R^1$ in which $R^1$ represents a hydrogen atom, or a $(C_1-C_{18})$-alkyl, $(C_3-C_{12})$-cycloalkyl, $(C_6-C_{15})$-aryl, $(C_7-C_{15})$-aralkyl, an acyl radical of a mono- or polybasic carboxylic acid, or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic acids and of diarylphosphinic acids, and b)
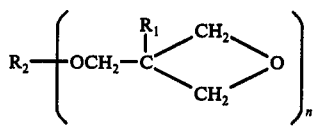
(3)

wherein $R_1$ is H, $C_1$-$C_{18}$-alkyl, $C_1$-$C_{18}$-hydroxyalkyl, $C_6$-$C_{15}$-aryl, ($C_6$-$C_{15}$-aryl)-oxymethyl, $C_7$-$C_{15}$-aralkyl or ($C_7$-$C_{15}$-aralkyl)-oxymethyl, $R_2$ is H, $C_1$-$C_{18}$-alkyl, $C_6$-$C_{15}$-aryl, $C_7$-$C_{15}$-aralkyl or the acyl radical of a monobasic or polybasic carboxylic acid or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic acids and of diarylphosphinic acids, and $n$ is an integer which has a value of 1 or is equal to the acid functionality of the acid from which the acid radical $R_2$ is derived, said mixture containing from 2 to 10 oxetane groups per phosphorus atom.

31. A plastics composition stabilized against discoloration from heat and atmospheric oxygen comprising a plastics material, and an effective amount of a mixture of an oxetanyl free neutral ester of phosphorous acid and an oxetane compound of the formula (3)

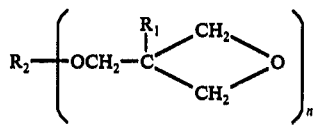
(3)

wherein $R_1$ is H, $C_1$-$C_{18}$-alkyl, $C_1$-$C_{18}$-hydroxyalkyl, $C_6$-$C_{15}$-aryl, ($C_6$-$C_{15}$-aryl)-oxymethyl, $C_7$-$C_{15}$-aralkyl or ($C_7$-$C_{15}$-aralkyl)-oxymethyl, $R_2$ is the ester residue of an acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic and diarylphosphinic acid, and $n$ is an integer which has a value equal to the acid functionality of the acid from which the acid radical $R_2$ is derived, said mixture containing from 2 to 10 oxetane groups per phosphorus atom.

32. A plastics composition stabilized against discoloration from heat and atmospheric oxygen comprising a plastics material and an effective amount of a mixture of an oxetanyl free neutral ester of phosphorous acid and an oxetane compound of the formula

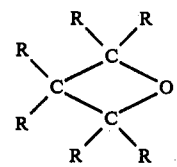

wherein each of the six groups R independently represents a hydrogen atom or a ($C_1$-$C_{18}$)-alkyl, ($C_3$-$C_{12}$)-cycloalkyl, ($C_6$-$C_{15}$)aryl, ($C_7$-$C_{15}$)-aralkyl group or a group of the formula $CH_2O$-$R^1$ in which $R^1$ represents a hydrogen atom, or a ($C_1$-$C_{18}$)-alkyl, ($C_3$-$C_{12}$)-cycloalkyl, ($C_6$-$C_{15}$)-aryl, ($C_7$-$C_{15}$)-aralkyl, or acyl radical of a mono- or polybasic carboxylic acid, or the ester residue of an inorganic acid selected from the group consisting of boric, silicic, alkylboric, arylboric, stannoic, stibonic, orthophosphoric, pyrophosphoric, polyphosphoric, alkanephosphonic, arylphosphonic, dialkylphosphinic and diarylphosphinic acids, said mixture containing from 2 to 10 oxetane groups per phosphorus atom.

33. A method according to claim 20 wherein the oxetane compound and the said ester are added to plastics material separately.

* * * * *